(12) United States Patent
Mayer et al.

(10) Patent No.: US 7,701,974 B2
(45) Date of Patent: Apr. 20, 2010

(54) ROUTING INFORMATION PROCESSING FOR NETWORK HIDING SCHEME

(75) Inventors: Georg Mayer, Espoo (FI); Ilkka Westman, Helsinki (FI); Kati Koho, Espoo (FI)

(73) Assignee: Nokia Corporation, Espoo (FI)

( * ) Notice: Subject to any disclaimer, the term of this patent is extended or adjusted under 35 U.S.C. 154(b) by 1654 days.

(21) Appl. No.: 10/801,584

(22) Filed: Mar. 17, 2004

(65) Prior Publication Data

US 2005/0083974 A1 Apr. 21, 2005

(30) Foreign Application Priority Data

Oct. 21, 2003 (EP) .................................. 03023894

(51) Int. Cl.
*H04J 3/00* (2006.01)
(52) U.S. Cl. ..................... 370/474; 713/151; 713/153; 713/176
(58) Field of Classification Search ................. 370/259, 370/351, 401, 389, 392, 474; 709/227; 713/153, 713/176
See application file for complete search history.

(56) References Cited

U.S. PATENT DOCUMENTS

| 5,878,231 | A | * | 3/1999 | Baehr et al. ................. 709/245 |
| 6,185,612 | B1 | * | 2/2001 | Jensen et al. ................. 709/223 |
| 6,857,072 | B1 | * | 2/2005 | Schuster et al. ............. 713/160 |
| 6,888,828 | B1 | * | 5/2005 | Partanen et al. ............. 370/389 |
| 2002/0129236 | A1 | * | 9/2002 | Nuutinen ..................... 713/151 |
| 2003/0051130 | A1 | * | 3/2003 | MeLampy et al. .......... 713/153 |
| 2003/0204728 | A1 | * | 10/2003 | Irwin .......................... 713/176 |
| 2004/0088419 | A1 | * | 5/2004 | Westman ..................... 709/227 |
| 2004/0152469 | A1 | * | 8/2004 | Yla-Outinen et al. ........ 455/453 |
| 2004/0203799 | A1 | * | 10/2004 | Siegel ......................... 455/445 |
| 2004/1020379 |   | * | 10/2004 | Siegel ......................... 455/445 |

OTHER PUBLICATIONS

"*Digital Cellular Telecommunications System (phase 2+); Universal Mobile Telecommunications System (UMTS); IP Multimedia call control Protocol based on SIP and SDP; Stage 3 (3 GPP TS 24.229 version 5.5.0 Release 5)*", ETSI TS 124 229 V5.5.0 Jun. 2003; pp. 1-253.

(Continued)

*Primary Examiner*—Ricky Ngo
*Assistant Examiner*—David Oveissi
(74) *Attorney, Agent, or Firm*—Harrington & Smith (57) ABSTRACT

The routing information is extracted from a received message at a border between a first network and a second network, and at least one invalid entry is added to first-network entries of the routing information which relate to a routing path of the message within the first network. The at least one invalid entry and the first-network entries are encrypted by using an own token at least for each of the first-network entries. As an alternative, a tokenized second-network entry extracted from the routing information and relating to the routing path of the message within the second network is decrypted, and its content is reversed. In both cases, the routing information is replaced by the processed routing information and the message is forwarded to the second network. This allows to preserve the order of routing entries and to hide the amount of switches that have been traversed in the home network.

20 Claims, 3 Drawing Sheets

OTHER PUBLICATIONS

"*Digital Cellular Telecommunications System (phase 2+); Universal Mobile Telecommunications System (UMTS); Signalling flows for the IP Multimedia Call control Based on SIP and SDP; Stage 3 (3GPP TS 24.228 Version 5.5.0 Release 5)*" ETSI TS 124 228 v5.5.0 Jun. 2003.

3GPP TS 23.228 V6.3.0 (Sep. 2003); $3^{rd}$ Generation Partnership Project; Technical Specification Group Services and System Aspects; IP Multimedia Subsystem (IMS); Stage 2 (Release 6).

Network Working Group; RFC 3261; Standards Track; Obsoletes: 2543; SIP: Session Initiation Protocol; Jun. 2002.

* cited by examiner

ROUTING INFORMATION PROCESSING FOR NETWORK HIDING SCHEME

BACKGROUND OF THE INVENTION

1. Field of the Invention

The present invention relates to a method and device for processing a routing information in a packet data network, such as an Internet Protocol (IP) Multimedia Subsystem (IMS) provided on top of a packet data network to offer voice and multimedia services e.g. for third generation mobile devices, or any other IP-based network.

2. Description of the Related Art

The Session Initiation Protocol (SIP) as defined in the Internet Engineering Task Force (IETF) specification RFC 3261, provides an emerging standard for setting up multimedia sessions on the Internet. Its basic capabilities are setup modification and tear down of any communication session, so it is a signaling protocol. SIP also provides personal mobility, meaning that a consumer is reachable via a single address regardless of its current point of attachment to the network.

In order to support multimedia services, seamless mobility and efficient multiparty conferencing, the IP layer has been enhanced. Mobile IP allows terminals to move freely between different mobile networks.

SIP is used to establish, modify and terminate sessions as well as send and receive transactions. It provides personal mobility by allowing a user to dynamically register to the network with his communication address, i.e. SIP URI (Uniform Resource Indicator). A session is usually a number of Real-time Transport Protocol (RTP) streams to be exchanged. Normally, a session is a combination of speech, audio and video streams, but it may also contain shared applications. A basic SIP network is composed of four types of elements i.e. User Agents (UA), Proxy Servers, Redirect Servers and Registrar Servers. User Agents typically reside in endpoints such as IP phones, personal computers or mobile devices. They initiate requests and provide responses. Usually, UAs also have an interface to media handling and to the actual application software providing the user interface. Proxy servers are intermediaries, which receive and forward requests providing them with, e.g., routing or other services. Redirect servers simply respond to a request by asking its originator to redirect it to a new address. Registrar servers keep track on the actual points of contact of the consumers by accepting registrations from the UAs. Registrar servers and the SIP registration procedure in general provide user mobility as the consumer is able to be reachable from any location via a single address. In this sense, they resemble Home Location Register (HLR) functionality in the Global System for Mobile communications (GSM) networks. Each consumer is part of a domain and each domain runs at least one registrar server, which knows the location of its consumers if the are registered.

SIP uses an address format common to Internet Mail, i.e. "user@domain". The domain part is used to find the correct domain for the consumer and the user part is used to distinguish between individual consumers within a domain. SIP includes request and response messages comprising header fields, e.g. for defining where the request is to be sent next, the recipient address, the sender address etc. Furthermore, a SIP message may contain a payload portion for transmitting subscriber or service specific information.

Currently, the 3rd Generation Partnership Project (3GPP) is specifying IMS (IP Multimedia Subsystem) e.g. in its specification TS 23.228 as an access independent subsystem which can be used in connection with different networks. IMS uses SIP for session initiation. Basically IMS is just an instance of a SIP network. It has a number of proxies and a registrar. The UA is situated in the terminal device or user equipment (UE). When two devices establish a session they talk to each other via Call State Control Function or Call Session Control Function (CSCF) elements. The UE is connected to a Proxy-CSCF (P-CSCF) arranged in a visited domain of the UE and providing basic IP connectivity and mobile management below it. The UE uses SIP to communicate with the P-CSCF which is similar to a SIP proxy server. In such a case, the consumer or subscriber of the UE is roaming in the visited domain where the P-CSCF is located. The role of the P-CSCF is to provide emergency call and other such services requiring specific knowledge of the visited domain. In case the consumer or subscriber is not roaming the UE is connected to a P-CSCF located in the home domain. Instead of radio access network also alternative access networks may be used. Instead of mobile or cellular terminal device also other kind of terminals may be used, especially in alternative access networks.

Furthermore, an S-CSCF is always located in the subscriber's or consumer's home domain and takes the role of the SIP registrar and proxy servers, so that the UE can be registered at the S-CSCF using SIP via the P-CSCF. Furthermore, an I-CSCF is provided as another SIP proxy server responsible mainly for finding the correct S-CSCF for a given subscriber or consumer. The S-CSCFs can be dynamically allocated per registration in order to achieve efficient load balancing and error residency. An Application Server (AS) is provided as a SIP element dealing with the services provided to the UE. Separate ASs can be provided for different purposes. Finally, a Home Subscriber Server (HSS) is arranged for profile management and authentication.

In IMS, subsequent SIP messages follow the path recorded into a Record-Route header of the initial request, while interrogating network nodes may drop themselves out and other network elements stay on path. On the other hand, proxy servers in the middle may ask to remain on the signaling path for the duration of the call. This might be useful if the proxy offers some services to the call.

Topology Hiding, also known as Network or Configuration Hiding, allows an operator to hide the names and amount of the operator's SIP servers to another operator. Furthermore it hides the topology of the network. Topology Hiding is specified within the IMS (see e.g. 3GPP specification TS 23.228). Currently, a solution for it is described in the 3GPP specification TS 24.229, but this solution may lead to routing errors. Topology hiding can be applied by none, only one or both home networks, it cannot be applied by a visited network. The present invention applies to any case where at least one of the home networks applies topology hiding.

Figure 1:
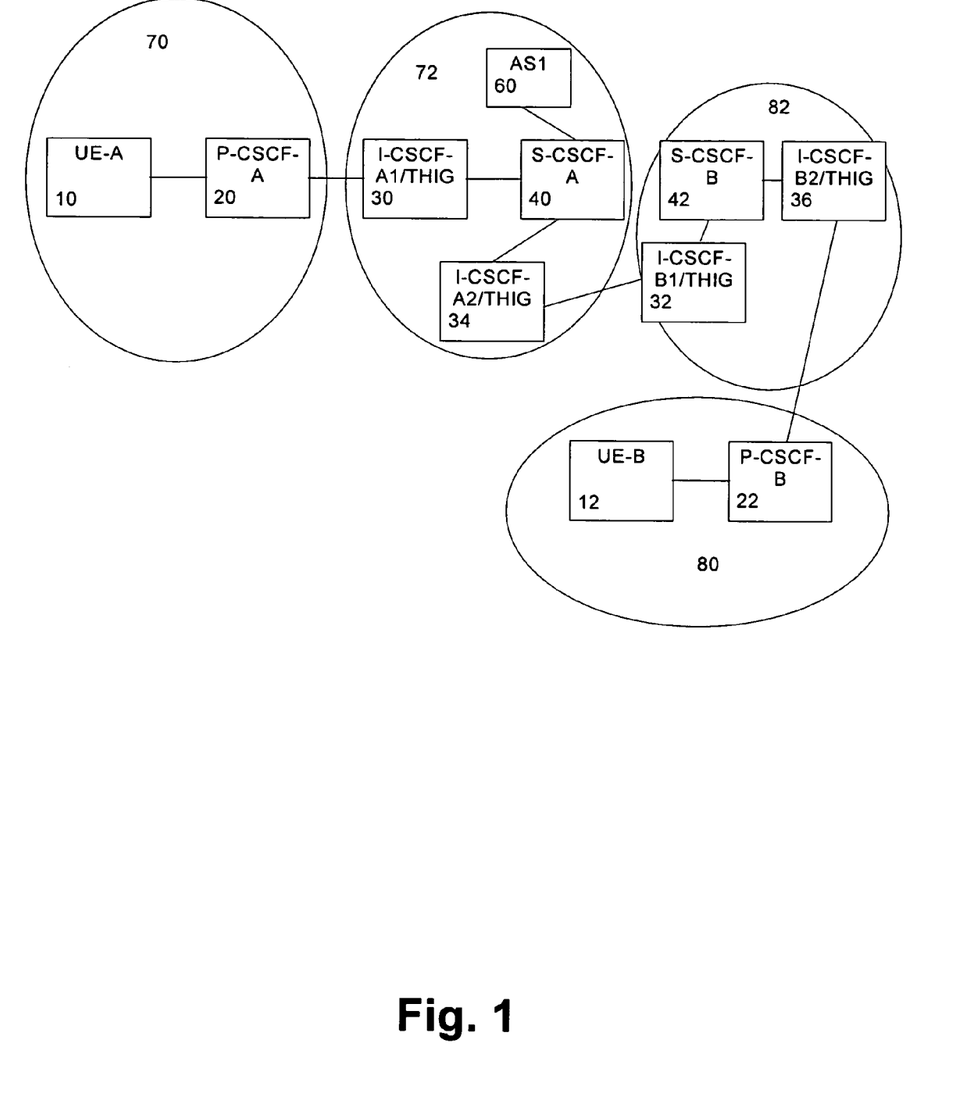
FIG. 1 shows an IMS network architecture in which the present invention can be implemented.

FIG. 1 shows a schematic block diagram of an exemplary IMS network architecture in which the present invention can be implemented. The SIP Proxies in the IMS are called CSCF, and for the discussed problem underlying the present invention the following CSCF types of FIG. 1 are of relevancy. A P-CSCF-A 20 is a SIP outbound proxy to which the mobile station UE-A 10 of User A is attached in its currently visited domain 70. Furthermore, an I-CSCF-A1 30 is provided as the I-CSCF between the P-CSCF-A 20 and an S-CSCF-A 40, and acts as a topology hiding gateway (THIG). The S-CSCF-A 40 is the SIP Proxy providing services, provided for example by an AS1 60 or other ASs (not shown), for User A in A's home network 72. Additionally, another I-CSCF-A2 34 is provided as the I-CSCF used by the S-CSCF-A 40 as the outgoing THIG when sending messages to the home network 82 of User B having a mobile station UE-B 12. The I-CSCF-A2 34 can also be the incoming THIG for messages from User B's home network 82. A further I-CSCF-B1 32 is arranged as the I-CSCF used by an S-CSCF-B 42 as the outgoing THIG when sending messages to the home network 72 of User A. The I-CSCF-B1 32 can also be the incoming THIG for messages from User A's home network 72. The S-CSCF-B 42 is the SIP Proxy providing services for User B in B's home network 82. Another I-CSCF-B2 is the I-CSCF between the S-CSCF-B 42 and a P-CSCF-B 22, and acts as a THIG. The P-CSCF-B 22 is the SIP outbound proxy to which the mobile station UE-B 12 of User B is attached in its visited network 80. I-CSCF and THIG functionalities may be implemented separately. They also may be named and/or combined with other functionalities differently when used in SIP or other types of networks based e.g. on the specification of 3GPP2 or IETF.

All SIP signaling within the IMS goes at least through these four SIP Proxies in the above listed order, whenever topology hiding is applied in both home networks.

It is to be noted here, that in the following "THIG" may be omitted in the notation "I-CSCF(THIG)" and "I-CSCF/THIG" for the sake of brevity. The latter case notation denotes the same as the corresponding former case notation, e.g., I-CSCF-B1(THIG) and I-CSCF-B1/THIG may be referred simply with i-cscf-b1.

In the following, the conventional mechanism for network hiding is described and a sequencing problem of Route headers is shown.

The current solution described in the 3GPP specification TS 24.229 works roughly in the following way:
- all SIP messages (requests and responses) sent outside a users home network (either to the home network of the other user or the visited network of the served user) must traverse an I-CSCF/THIG in the users home network before leaving it;
- the I-CSCF/THIG finds out all SIP URIs that were added by the home network to Via, Route, Record-Route, Path, Service-Route or any other header;
- the I-CSCF/THIG applies an internal encryption mechanism and generates an encrypted name and/or address information which is called "token".

For example, the following header can be sent outside of User A's home network 72 and is received (e.g. in an INVITE request) by I-CSCF-A2 34 (indentions and line breaks as well as omission of branch parameter are just there for better readability):
[I] Via: SIP/2.0/UDP s-cscf-a.home1.net,
SIP/2.0/UDP i-cscf-a1.home1.net,
SIP/2.0/UDP p-cscf-a.visited1.net,
SIP/2.0/UDP [5555::aaa:bbb:ccc:ddd]
The I-CSCF-A2 34 now selects the entries belonging to its home network, which are:
SIP/2.0/UDP s-cscf-a.home1.net
SIP/2.0/UDP i-cscf-a1.home1.net and hides them by generating a token (e.g. "1987klwkmlkmva98u4q5") by whatever local encryption mechanism. For better readability the token is further on represented by the following string:
Token(SIP/2.0/UDP s-cscf-a.home1.net,
SIP/2.0/UDP i-cscf-a1.home1.net)
The I-CSCF-A2 34 then forms a valid SIP Via header entry from the token and adds the tokenized-by tag:
SIP/2.0/UDP Token(SIP/2.0/UDP s-cscf-a.home1.net,
SIP/2.0/UDPi-cscf-a1.home1.net)@home1.net;
tokenized-by=home1.net inserts it to the Via header and adds its own address:
[II] Via: SIP/2.0/UDP i-cscf-a2.home1.net,
SIP/2.0/UDP Token(SIP/2.0/UDP s-cscf-a.home1.net,
SIP/2.0/UDPi-cscf-1.home1.net)@home1.net;
tokenized-by=home1.net,
SIP/2.0/UDP p-cscf-a.visited1.net,
SIP/2.0/UDP [5555::aaa:bbb:ccc:ddd]

The request traverses the other SIP-elements, until it reaches the end user, which sends back a response. The response to the request is routed based on the Via-header, so the response at one point hits I-CSCF-A2 34, showing exactly the same entry as shown in [II]. In order to be able to route inside the home network 72, the I-CSCF-A2 34 selects all the entries which are indicated as "tokenized-by=home1.net" and decrypts them. Afterwards the Via-header looks again as in [I] and can be routed. Here there is no problem.

In the case of the Record-Route header, the same mechanism is applied, but it creates a problem.

User A sends a request to User B, the CSCFs put themselves into the Record-Route header, of which both users, when sending further requests that are related to this dialog (e.g. PRACK, UPDATE, BYE) form the Route header. User B sends back the Route header in the response to User A, so both have then the same route set.

However, when creating the Route for a new request, User A obtains a reversed order of the Record-Route header after decryption. It is noted that the request was sent to an application server (AS) of the network operator in home1.net and returned to the same S-CSCF, according to the conventional IMS service-procedures.

As an example, the Record-Route header as received in an INVITE request by User B might look as follows:
[III] Record-Route: p-cscf-b,
i-cscf-b2,
token(s-cscf-b,i-cscf-b1)@home2.net;tokenized-
by=home2.net,
i-cscf-a2,
token (s-cscf-a,as1,s-cscf-a,i-cscf-a1)@home1.net;
tokenized-by=home1.net,
p-cscf-a Hence, the sent order can be represented as: 1, 2, (3,4), 5, (6,7,8,9), 10, where each number represents a specific one of the above servers or nodes passed during the routing procedure, and the numbers in brackets indicate tokenized or encrypted routes.

The Record-Route header is returned to User A in the response to the initial request. User A now wants to send e.g. the PRACK or any subsequent request or any other request along the recorded route, therefore it creates the Route header by simply reversing the order of the Record-Route entries, in accordance with the normal SIP procedure. Consequently, the Route header can be expressed as follows:
[IV] Route: p-cscf-a,
token(s-cscf-a,as1,s-cscf-a,i-cscf-a1)@home1.net;
tokenized-by=home1.net
i-cscf-a2,
token(s-cscf-b,i-cscf-b1)@home2.net;tokenized-
by=home2.net,
i-cscf-b2,
p-cscf-b This routing order can be represented as: 10, (6,7,8,9), 5, (3,4), 2, 1.

The request will thus be sent to any I-CSCF in the home network, not to the I-CSCF-A1 30, which should be first on the route. This problem results from the fact that the entry of the I-CSCF-A1 30 has been maintained as encrypted by the I-CSCF-A2 34 when processing the initial request e.g. INVITE request.

However, this wrong order of entries within the tokens cannot be reversed by the UE, neither UE-A 10 nor UE-B 12, as the UE cannot look inside the token. When the first token is de-crypted, the entries will look like:

[V] Route: p-cscf-a,
  s-cscf-a,
  as1,
  s-cscf-a,
  i-cscf-a1,
  i-cscf-a2,
  (...)

which can be represented as: 10, 6, 7, 8, 9, 5, (...).

However, the correct routing order should look like:

[VI] Route: p-cscf-a,
  i-cscf-a1,
  s-cscf-a,
  as1,
  s-cscf-a,
  i-cscf-a2,
  token(s-cscf-b,i-cscf-b1)@home2.net,tokenized-by=home2.net,
  i-cscf-b2,
  p-cscf-b which can be represented as: 10, 9, 8, 7, 6, 5 (...).

Hence, the user is not capable to reverse the entries within tokens as the UE is not capable to look inside the tokens. Furthermore the request may then be sent to any I-CSCF in the home network, not specifically to the one, which should be the first on the route.

SUMMARY OF THE INVENTION

It is therefore an object of the present invention to provide a method and device for processing a routing header, by means of which routing errors due to encryption of multiple names or addresses into one token can be prevented.

This object is achieved by a method of processing a routing information in a packet data network, said method comprising the steps of:
  extracting said routing information from a received message at a border between a first network and a second network;
  adding at least one invalid entry to first-network entries of said routing information, said first-network entries relating to a routing path of said message within said first network;
  generating an encrypted routing information by encrypting said at least one invalid entry and said first-network entries by using an own token at least for each of said first-network entries;
  replacing said routing information of said received message by said encrypted routing information; and
  forwarding said received message with said encrypted routing information to said second network.

Furthermore, the above object is achieved by a network device for processing a routing information in a packet data network, said device comprising:
  extracting means for extracting said routing information from a received message at a border between a first network and a second network;
  adding means for adding at least one invalid entry to first-network entries of said routing information, said first-network entries relating to a routing path of said message within said first network;
  encrypting means for generating an encrypted routing information by encrypting said at least one invalid entry and said first-network entries by using an own token at least for each of said first-network entries;
  replacing means for replacing said routing information of said received message by said encrypted routing information; and
  forwarding means for forwarding said received message with said encrypted routing information to said second network.

Each of the first-network entries may comprises name and/or address information of a network node through which said received message has been routed.

Additionally, the above object is achieved by a method of processing a routing information in a packet data network, said method comprising the steps of:
  extracting said routing information from a received message at a border between a first network and a second network;
  generating a decrypted and reversed routing information by decrypting a tokenized second-network entry relating to a routing path of said message within said second network and by reversing the content of the decrypted second-network entry;
  replacing said routing information of said received message by said decrypted and reversed routing information; and
  forwarding said received message with said decrypted and reversed routing information to said second network.

Finally, the above object is achieved by a network device for processing a routing information in a packet data network, said device comprising:
  extracting means for extracting said routing information from a received message at a border between a first network and a second network;
  decrypting and reversing means for generating a decrypted and reversed routing information by decrypting a tokenized second-network entry relating to a routing path of said message within said second network and by reversing the content of said decrypted second-network entry;
  replacing means for replacing said routing information of said received message by said decrypted and reversed routing information; and
  forwarding means for forwarding said received message with said decrypted and reversed routing information to said second network.

The tokenized first-network entry may comprise encrypted name and/or address information of a sequence of network nodes through which the received message has been routed.

The border between said first and second networks may be defined at a gateway device which the message traverses on a connection between said first and second networks.

Accordingly, alternative simple but effective solutions for the above sequencing problem can be provided. According to the first alternative solution in the proposed encryption processing, the I-CSCF(THIG) does not encrypt entries of other I-CSCFs. Moreover, instead of generating one token per tokenization process, the I-CSCF(THIG) creates multiple tokens, of which some are invalid. Also every valid token has only one entry, while invalid tokens may comprise one or more invalid entries. This allows to preserve the order of the Record-Route header entries and to hide the amount of switches that have been traversed in the home network. In the proposed decryption processing invalid entries in the Route header are silently discarded when encountered. Another way is to not discard invalid entries during the decryption but during the routing.

According to second alternative solution in the proposed encryption processing, the I-CSCF does not encrypt entries of its own. Moreover, I-CSCF(THIG) generates one token per tokenization process. So a token may contain one or more entries. This allows to hide the amount of switches that have been traversed in the home network. In the proposed decryption processing, the content of a tokenized or encrypted entry in the routing header is reversed after decryption. The size of the Record-Route and Route headers therefore does not have to be increased during encryption e.g. by invalid entries or tokens restricted to single names or addresses like in the first alternative solution. This prevents processing overhead for distinguishing and removal of invalid entries after decryption.

The tokenized network entry of an incoming and/or outgoing tokenizing network node may be marked, and the reversing operation may be suppressed at outgoing tokenizing network nodes. As an alternative, network entries may be reversed at incoming tokenizing network nodes before encryption. Thus, the reversing operation can be suppressed at the decryption because the entries are already in the correct order. Thereby, a problem can be solved which occurs when the Record-Route header is used as the Route header e.g. in a response message.

The concerned packet data network may comprises an IP Multimedia Subsystem. Then, the network device may comprises an Interrogating Call Session Control Function.

The routing information may be conveyed in a routing header of the message. This routing header can be a Record-Route header or a Route header or Via header of a Session Initiation Protocol message.

The processing method may be a method for topology hiding in said packet data network. Optionally, the topology hiding method may be applied in response to a user identity marked with a predetermined information. In particular, the topology hiding method may be applied in response to a network identity. Thereby, topology hiding can be applied individually against single users as well as against all users of the hiding network. Topology hiding can also be applied individually against single users as well as against all users of any foreign network.

Other advantageous developments of the present invention are defined in the dependent claims.

BRIEF DESCRIPTION OF THE DRAWINGS

The present invention will now be described on a basis of preferred embodiments with reference to the accompanying drawings, in which.

DETAILED DESCRIPTION OF THE PREFERRED EMBODIMENTS

The preferred embodiments will now be described on the basis of an IMS network architecture as shown in FIG. 1.

According to the first preferred embodiment, header encryption processing is modified in that I-CSCF's do not encrypt entries of other I-CSCFs. Additionally, instead of generating one token per tokenization process, the I-CSCF creates multiple tokens, of which some are invalid. This allows to preserve the order of the Record-Route header entries and to hide the amount of switches that have been traversed in the home network.

Figure 2:
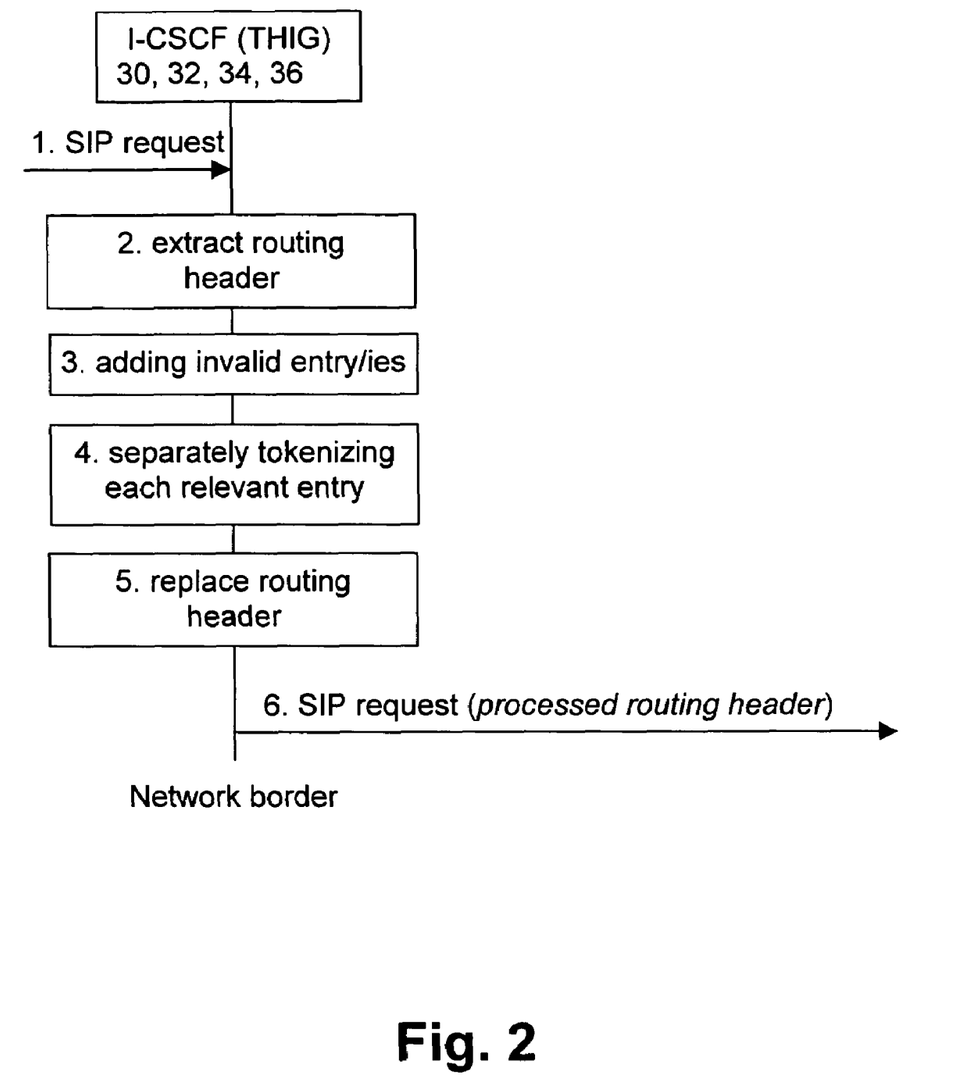
FIG. 2 shows a schematic signaling and processing diagram of a header encryption processing according to a first preferred embodiment.

FIG. 2 shows a schematic processing and signaling diagram indicating the processing steps or functions at the I-CSCFs (THIG) 30, 32, 34 and 36 of the network configuration shown in FIG. 1. When a SIP request or message is received at the concerned I-CSCF (THIG) in step 1, the Record-Route header is extracted in step 2 and invalid entries are added in step 3 to blurr or hide the actual number of routing entries which correspond to routing nodes through which the SIP request has been routed. Then, the relevant entries, i.e. entries which correspond to routing nodes located within the network of the concerned I-CSCF (THIG), are separately encrypted or tokenized in step 4 by using one token for each individual routing entry. Then, in step 5, the received Record-Route header is replaced by the new Record-Route header as processed in the above steps 3 and 4, and the SIP request is forwarded or routed via the network border to the neighboring network.

Therefore, for the initially described example, the Record-Route header [III] could e.g. look like:

[III→VII] Record-Route: p-cscf-b,
  i-cscf-b2,
  token(s-cscf-b)@home2.net;tokenized-by=home2.net,
  token(invalid)@home2.net;tokenized-by=home2.net,
  i-cscf-b1,
  i-cscf-a2,
  token(s-cscf-a)@home1.net;tokenized-by=home1.net,
  token(as1)@home1.net;tokenized-by=home1.net,
  token(s-cscf-a)@home1.net;tokenized-by=home1.net,
  token(invalid)@home1.net;tokenized-by=home1.net,
  token(invalid)@home1.net;tokenized-by=home1.net,
  i-cscf-a1,
  p-cscf-a and therefore the UE-A 10 would be able to reverse the order when creating the Route header:

[VIII] Route: p-cscf-a,
  i-cscf-a1,
  token(invalid)@home1.net;tokenized-by=home1.net,
  token(invalid)@home1.net;tokenized-by=home1.net,
  token(s-cscf-a)@home1.net;tokenized-by=home1.net,
  token(as1)@home1.net;tokenized-by=home1.net,
  token(s-cscf-a)@home1.net;tokenized-by=home1.net,
  i-cscf-a2,
  i-cscf-b1,
  token(invalid)@home2.net;tokenized-by=home2.net,
  token(s-cscf-b)@home2.net;tokenized-by=home2.net,
  i-cscf-b2,
  p-cscf-b Thus, the correct routing sequence can be derived at the receiving-side. The invalid entries may be detected based on the respective content of the name and/or address information. This may be achieved e.g. by comparing the content with a list of valid contents or by adding a flag or marking invalid entries by any other suitable mechanism. As an alternative, invalid tokens may as well comprise more than one invalid entry.

According to the second preferred embodiment, header decryption processing is modified in that the content of a tokenized entry in the Route header is reversed whenever an I-CSCF(THIG) decrypts it. The order or sequence of entries in a token, which contains multiple entries, in the Route header is simply reversed after the token has been decrypted. The original token is replaced with the result.

Figure 3:
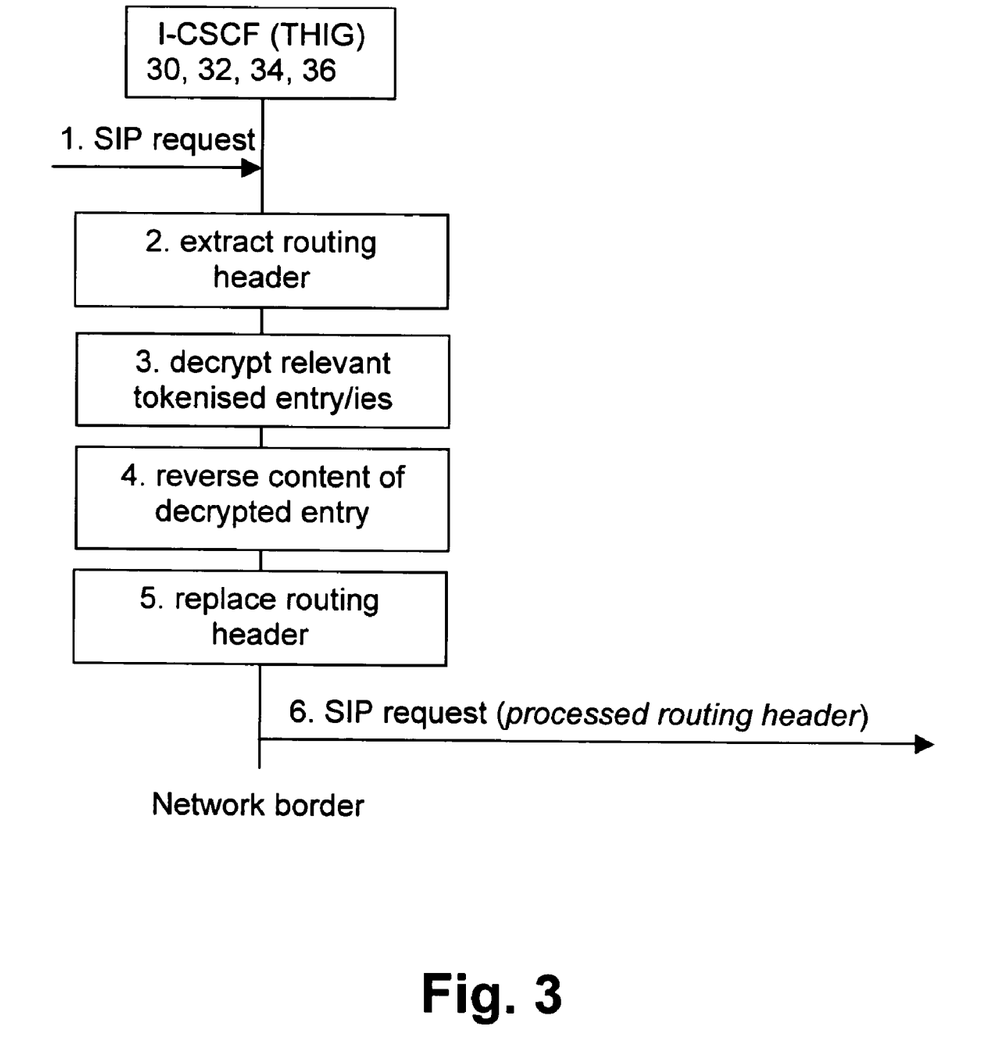
FIG. 3 shows a schematic signaling and processing diagram of a header decryption processing according to a second preferred embodiment.

FIG. 3 shows a schematic processing and signaling diagram indicating the processing steps or functions at the I-CSCFs (THIG) 30, 32, 34 and 36 of the network configuration shown in FIG. 1. When a SIP request or message is received at the concerned I-CSCF (THIG) in step 1, the Route header is extracted in step 2 and relevant tokenized entries, i.e. tokenized entries which correspond to a routing path or sequence located within the network of the concerned I-CSCF (THIG), are decrypted in step 3. Then, the content of the decrypted entry is reversed with respect to the routing sequence (step 4). In step 5, the received Route header is replaced by the new Route header as processed in the above steps 3 and 4, and the SIP request is forwarded or routed from the network border to the network.

In the following example, it is assumed that the elements on the path from UE-A 10 to UE-B 12 are the following:

UE-A 10→P-CSCF-A 20→network border→I-CSCF-A1 (THIG) 30→S-CSCF-A 40→AS1 60→S-CSCF-A 40→I-CSCF-A2(THIG) 34→network border→I-CSCF-B1(THIG) 32→S-CSCF-B 42→I-CSCF-B2 (THIG) 36→network border→P-CSCF-B 22→UE-B 12.

The Record-Route header as received e.g. in the INVITE request by UE-B 12 would look as follows:
Record-Route: p-cscf-b,
  i-cscf-b2,
  token(s-cscf-b,i-cscf-b1)@home2.net;tokenized-by=home2.net,
  i-cscf-a2,
  token(s-cscf-a,as1,s-cscf-a,i-cscf-a1)@home1.net,
  tokenized-by=home1.net,
  p-cscf-a The Record-Route header is then returned towards the UE-A 10 in the response. The I-CSCF-B2(THIG) 36 on the path of the response to the UE-A 10 decrypts the tokenized entry tokenized-by its own network. The result would be:
Record-Route: p-cscf-b,
  i-cscf-b2,
  s-cscf-b,
  i-cscf-b1,
  i-cscf-a2,
  token (s-cscf-a,as1,s-cscf-a,i-cscf-a1)@home1.net;
  tokenized-by=home1.net,
  p-cscf-a The I-CSCF-B1(THIG) 32 on the path of the response to UE-A 10 encrypts the entries of the own network 82 except its own entry. The result would be:
Record-Route: p-cscf-b,
  token(i-cscf-b2,s-cscf-b)@home2.net;tokenized-by=home2.net,
  i-cscf-b1,
  i-cscf-a2,
  token(s-cscf-a,as1,s-cscf-a,i-cscf-a1)@home1.net;
  tokenized-by=home1.net,
  p-cscf-a The I-CSCF-A2(THIG) 34 on the path of the response to UE-A 10 decrypts the tokenized entry tokenized-by its own network 72. The result would be:
Record-Route: p-cscf-b,
  token(i-cscf-b2,s-cscf-b)@home2.net;tokenized-by=home2.net,
  i-cscf-b1,
  i-cscf-a2,
  s-cscf-a,
  as1,
  s-cscf-a,
  i-cscf-a1,
  p-cscf-a The I-CSCF-A1(THIG) 30 on the path of the response to UE-A 10 encrypts the entries of the own network 72 except its own entry. The result would be:

Record-Route: p-cscf-b,
  token(i-cscf-b2,s-cscf-b)@home2.net;tokenized-by=home2.net,
  i-cscf-b1,
  token(i-cscf-a2,s-cscf-a,As1,s-cscf-a)@home1.net;
  tokenized-by=home1.net,
  i-cscf-a1,
  p-cscf-a Now, the UE-A 10 sends a subsequent request e.g. PRACK along the recorded route. Therefore it creates the Route header by simply reversing the order of the Record-Route entries which is normal SIP procedure. The result would be:
Route: p-cscf-a,
  i-cscf-a1,
  token(i-cscf-a2,s-cscf-a,As1,s-cscf-a)@home1.net;
  tokenized-by=home1.net,
  i-cscf-b1,
  token(i-cscf-b2,s-cscf-b)@home2.net;tokenized-by=home2.net,
  p-cscf-b The I-CSCF-A1(THIG) 30 on the path of the request to UE-B 12 first removes its own entry and then decrypts the tokenized entry tokenized-by its own network 72 and makes reverse and replaces the tokenized entry with the result. The result would be:
Route: s-cscf-a,
  As1,
  s-cscf-a,
  i-cscf-a2,
  i-cscf-b1,
  token(i-cscf-b2,s-cscf-b)@home2.net;tokenized-by=home2.net,
  p-cscf-b Finally, the I-CSCF-B1(THIG) 32 on the path of the request to UE-B 12 first removes its own entry and then decrypts the tokenized entry tokenized-by its own network and makes reverse and replaces the tokenized entry with the result. The result would be:
Route: s-cscf-b,
  i-cscf-b2,
  p-cscf-b.

Consequently, correct decryption of tokenized or encrypted name or address information in the routing header can be assured.

However, the above solution according to the second preferred embodiment does not solve the case where the content of the Record-Route header is used for the Route header from UE-B 12 to UE-A 10. In this case, the encrypted entry is not reversed at the I-CSCF(THIG) functions/entities that are entry points on the path to a network i.e. are located nearest to the header content replacing party in the network in question.

To achieve this, the incoming, i.e. the first, I-CSCF(THIG) of the network and the outgoing, i.e. the second, I-CSCF (THIG) of the network have to be distinguished. This should be done when routing the initial request sent from the UE-A 10 so that an indication is included into the name/address (SIP URI) of the first I-CSCF(THIG) when the first I-CSCF (THIG) inserts its name/address into the Record-Route header of the initial request. The content of the Record-Route header is returned in the response and is used as reversed to build the Route header of the subsequent requests sent from the UE-A 10. Normally, the indication should not be included in the name/address of the I-CSCF(THIG) already at the registration inserting it into the name/address of the I-CSCF (THIG) in the Path header where it would be copied to Service-Route header because the Service-Route header is normally built in the S-CSCF so that it contains only entries for the S-CSCF and the I-CSCF(THIG) in the correct order, i.e., ready to be used in Route header preserving the order. It is noted that the Record-Route header has to be reversed before used in Route header by the originating party.

Alternatively, an indication can be included in the name/ address of the outgoing i.e. the second I-CSCF(THIG) when the request is forwarded to it in order to be routed out from the network.

The indication may be a sign, a tag, a mark or the like, e.g., a parameter, a port, a bit/character string in the user part and/or host-domain part or alike included in the name/address or associated to the name/address of the I-CSCF(THIG).

When marking the first and second I-CSCF(THIG), respectively, the following examples could be used:
"first@i-cscf.home.net" and "second@i-cscf.home.net";
"first.i-cscf.home.net" and "second.i-cscf.home.net";
"i-cscf.home.net:12233" and "i-cscf.home.net:12234";
"i-cscf.home.net;first" and "i-cscf.home.net;second"; or
"i-cscf.home.net;order=first" and "i-cscf.home.net; order=second".

In the following example which is based on the above example of the second preferred embodiment, it is described how the second I-CSCF(THIG) shall handle requests (not to reverse after decryption) originated from UE-B 12.

A string "FIRST" in the user part is used as an example of an indication identifying I-CSCF(THIG) as the incoming i.e. the first I-CSCF(THIG) in the network. The outgoing, i.e. the second I-CSCF(THIG), is not indicated.

Record-Route header as received in INVITE by UE-B would be:
Record-Route: p-cscf-b,
　　i-cscf-b2,
　　token(s-cscf-b,first@i-cscf-b1)@home2.net;tokenised-by=home2.net,
　　i-cscf-a2,
　　token(s-cscf-a,as1,s-cscf-a,first@i-cscf-a1)@home1.net; tokenized-by=home1.net,
　　p-cscf-a The Record-Route header is returned towards UE-A 10 in the response.

The recorded route i.e. the content of the Record-Route header is also stored by UE-B 12. When the UE-B 12 sends a BYE request to the UE-A 10, the stored recorded route is used as route, i.e., in the Route header of the BYE request. Each network entity removes its own entry from the top of the Route header when it receives the request. The content of the Route header would look as follows in various steps on the path:

Route header in BYE request when sent from UE-B 12 would be:
Route: p-cscf-b,
　　i-cscf-b2,
　　token(s-cscf-b,first@i-cscf-b1)@home2.net;tokenized-by=home2.net,
　　i-cscf-a2,
　　token(s-cscf-a,as1,s-cscf-a,first@i-cscf-a1)@home1.net; tokenized-by=home1.net,
　　p-cscf-a The I-CSCF-B2(THIG) 36 on the path of the request to UE-A 10 decrypts the tokenized entry tokenized by its own network. The result is not reversed because there is no indication that this I-CSCF(THIG) would be the first I-CSCF (THIG) of the network. The result would be:
Route: s-cscf-b,
　　first@i-cscf-b1,
　　i-cscf-a2,
　　token(s-cscf-a,as1,s-cscf-a,first@i-cscf-a1)@home1.net; tokenized-by=home1.net,
　　p-cscf-a The I-CSCF-B1(THIG) 32 on the path of the request to UE-A 10 encrypts the entries of the own network except its own entry. This has no influence on the Route header because there are no entries left belonging to the own network.
Route: i-cscf-a2,
　　token(s-cscf-a,as1,s-cscf-a,first@i-cscf-a1)@home1.net; tokenized-by=home1.net,
　　p-cscf-a The I-CSCF-A2(THIG) 34 on the path of the request to UE-A 10 decrypts the tokenized entry tokenized by its own network. The result is not reversed because there is no indication that this I-CSCF(THIG) would be the first I-CSCF (THIG) of the network. The result would be:
Route: s-cscf-a,
　　as1,
　　s-cscf-a,
　　first@i-cscf-a1,
　　p-cscf-a The I-CSCF-A1(THIG) 30 on the path of the request to UE-A 10 encrypts the entries of the own network except its own entry. This has no influence in the Route header because there are no entries left belonging to the own network. The result would be:
Route: p-cscf-a The request is routed to the P-CSCF-A 20 and further to UE-A 10.

Implementation where the outgoing, i.e. the second, I-CSCF(THIG) is indicated is straight forward. The functionality is the same, i.e. the reverse is done in the incoming, i.e. the first, I-CSCF(THIG) of the network. It doesn't matter whether the name/address of the incoming (i.e. the first) I-CSCF(THIG) or the outgoing (i.e. the second) I-CSCF (THIG) carries the indication. If the first I-CSCF(THIG) is indicated, the I-CSCF(THIG) reverses the list of entries after decryption when its name/address carries the indication. If the second I-CSCF(THIG) is indicated, the I-CSCF(THIG) reverses the list of entries after decryption when its name/ address doesn't carry the indication.

In short, the indication is only a means to distinguish the incoming (i.e. the first) and outgoing (i.e. the second) I-CSCF (THIG) of the network. The operation to reverse the list of entries after decryption is done in the incoming (i.e. the first) I-CSCF(THIG) of the network.

As an alternative, instead of reversing in the Route header when needed, reversing can be performed already beforehand in the Record-Route header.

Instead of reversing by the incoming (i.e. the first) I-CSCF (THIG) the tokenized entries in the Route header of the subsequent requests from UE-A 10, the same I-CSCF(THIG) (i.e. the incoming or first I-CSCF(THIG)) reverses the same entries already before it tokenizes them in the Record-Route header of a response forwarded to the direction of UE-A 10.

In the following example which is based on the above example of the second preferred embodiment, a practical implementation of the alternative option is described.

The Record-Route header as received in INVITE by UE-B 12 would be:
Record-Route: p-cscf-b,
　　i-cscf-b2,
　　token(s-cscf-b,first@i-cscf-b1)@home2.net; tokenized-by=home2.net,
　　i-cscf-a2,
　　token(s-cscf-a,as1,s-cscf-a,first@i-cscf-a1)@home1.net; tokenized-by=home1.net, p-cscf-a The Record-Route header is returned towards UE-A 10 in the response.

The I-CSCF-B2(THIG) 36 on the path of the response to UE-A 10 decrypts the tokenized entry tokenized by its own network. The result would be:

Record-Route: p-cscf-b,
   i-cscf-b2,
   s-cscf-b,
   first@i-cscf-b1,
   i-cscf-a2,
   token(s-cscf-a,as1,s-cscf-a,first@i-cscf-a1)@home1.net;
     tokenized-by=home1.net,
   p-cscf-a The I-CSCF-B1(THIG) 32 on the path of the response to UE-A 10 encrypts the entries of the own network except its own entry. The lists of entries is reversed before encryption because there is an indication that this I-CSCF(THIG) is the first I-CSCF(THIG) of the network. The result would be:

Record-Route: p-cscf-b,
   token(s-cscf-b,i-cscf-b2)@home2.net;tokenized-
     by=home2.net,
   first@i-cscf-b1,
   i-cscf-a2,
   token (s-cscf-a,as1,s-cscf-a,first@i-cscf-a1)@home1.net;
     tokenized-by=home1.net,
   p-cscf-a The I-CSCF-A2(THIG) 34 on the path of the response to UE-A 10 decrypts the tokenized entry tokenized by its own network. The result would be:

Record-Route: p-cscf-b,
   token(s-cscf-b,i-cscf-b2)@home2.net;tokenized-
     by=home2.net,
   first@i-cscf-b1,
   i-cscf-a2,
   s-cscf-a,
   as1,
   s-cscf-a,
   first@i-cscf-a1,
   p-cscf-a The I-CSCF-A1(THIG) 30 on the path of the response to UE-A 10 encrypts the entries of the own network except its own entry. The lists of entries is reversed before encryption because there is an indication that this I-CSCF(THIG) is the first I-CSCF(THIG) of the network. The result would be:

Record-Route: p-cscf-b,
   token(s-cscf-b,i-cscf-b2)@home2.net;tokenized-
     by=home2.net,
   first@i-cscf-b1,
   token(s-cscf-a,As1,s-cscf-a,i-cscf-a2)@home1.net;token-
     ized-by=home1.net,
   first@i-cscf-a1,
   p-cscf-a Now, the UE-A 10 sends a subsequent request, e.g. PRACK, along the recorded route. Therefore it creates the Route header by simply reversing the order of the Record-Route entries which is normal SIP procedure. The result would be:

Route: p-cscf-a,
   first@i-cscf-a1,
   token(s-cscf-a,As1,s-cscf-a,i-cscf-a2)@home1.net;token-
     ized-by=home1.net,
   first@i-cscf-b1,
   token(s-cscf-b,i-cscf-b2)@home2.net;tokenized-
     by=home2.net,
   p-cscf-b The I-CSCF-A1(THIG) 30 on the path of the request to UE-B 12 first removes its own entry and then decrypts the tokenized entry tokenized-by its own network and makes no reverse because it is already done in Record-Route and replaces the tokenized entry with the result. The result would be:

Route: s-cscf-a,
   As1,
   s-cscf-a,
   i-cscf-a2,
   first@i-cscf-b1,
   token(s-cscf-b,i-cscf-b2)@home2.net;tokenized-
     by=home2.net,
   p-cscf-b The I-CSCF-A2(THIG) 34 on the path of the request to UE-B 12 encrypts the entries of the own network except its own entry. This has no influence on the Route header because there are no entries left belonging to the own network. The result would be:

Route: first@i-cscf-b1,
   token(s-cscf-b,i-cscf-b2)@home2.net;tokenized-
     by=home2.net,
   p-cscf-b The I-CSCF-B1(THIG) 32 on the path of the request to UE-B 12 first removes its own entry and then decrypts the tokenized entry tokenized-by its own network and makes no reverse because it is already done in Record-Route and replaces the tokenized entry with the result. The result would be:

Route: s-cscf-b,
   i-cscf-b2,
   p-cscf-b

The I-CSCF-B2(THIG) 36 on the path of the request to UE-B 12 encrypts the entries of the own network except its own entry. This has no influence on the Route header because there are no entries left belonging to the own network. The result would be:

Route: p-cscf-b

As in the above preceding example, also here the implementation where the outgoing, i.e. the second, I-CSCF (THIG) is indicated is straight forward.

As said earlier in the preceding example, the indication is only a means to distinguish the incoming (i.e. the first) and outgoing (i.e. the second) I-CSCF(THIG) of the network. The operation to reverse the list of entries before encryption is done in the incoming (i.e. the first) I-CSCF(THIG) of the network.

The incoming and/or outgoing I-CSCF(THIG) of the network are thus marked so that the content of the tokenized Route header entry can be reversed in the incoming I-CSCF (THIG) after decryption but not in the outgoing I-CSCF (THIG). This (i.e. not to reverse) is needed in the case where UE-B 12 sends a request to UE-A 10 using the route stored from Record-Route header of the initial request from UE-A 10.

It is also possible that in the examples described above the P-CSCF-A 20 and/or the P-CSCF-B 22 belongs to the home network of the UE-A 10 and/or the UE-B 12, respectively. In that case the I-CSCF-A1(THIG) 30 and/or I-CSCF-B2 (THIG) 36 does not encrypt the entry of P-CSCF-A 20 and/or P-CSCF-B 22, respectively.

So far, the hiding functionality, i.e. the network topology hiding, is specified only between networks and mainly because of business reasons. It is quite evident that the hiding cannot fulfill this requirement because users may freely buy a subscription of the hiding operator and register to that, i.e. to the hiding, network. Thus, a user is able to see the signaling using a terminal provided with proper software tools and modifications when registered in the home network (i.e. in the hiding network) because hiding is used only when the user registers from a foreign network (if hiding is applied to that foreign network).

It also seems to be a trend that hacking against IP networks increases using virus and other means. So it may be wise to hide as much of the topology of the network as possible also in home networks.

It is thus suggested for the first and second preferred embodiments, that the I-CSCF(THIG) is kept on path also when the UE is registered from the home network. If hiding is applied individually against single users, the I-CSCF is kept on path when the user has a signal in the subscription information that hiding shall be applied.

To achieve this, the name/address of the I-CSCF can be inserted into the Service-Route header during the registration. If hiding should be applied, the I-CSCF(THIG) inserts its name/address to the Path header of REGISTER message. Then, the S-CSCF builds the Service-Route header and inserts the name/address of the I-CSCF(THIG) if hiding shall be applied. So the S-CSCF makes the final decision when hiding should be used. This makes it possible to apply hiding against certain users only. Before the decision, the S-CSCF has already downloaded the user's subscription information from the HSS as part of the registration procedure. That information may contain a tag for those users against whom the network topology hiding has to be applied.

The S-CSCF may build the Service-Route so that it contains name/address of the I-CSCF(THIG) also when the user is registering from the same network, i.e., from its home network. So hiding can be applied inside the hiding network. The P-CSCFs are the only network elements (in addition to I-CSCF(THIG)s) that cannot be hidden with this procedure.

Thus, the idea is to put the I-CSCF(THIG) on the path either always (hiding applied also inside the hiding network) or based on the user identity (hiding applied against certain users independently whether they register from home or foreign i.e. visited network). This makes topology hiding applicable individually against single users as well as against all users registered in the home network, i.e. in the hiding network, and can be achieved by a simple addition to the existing functionality.

In summary, a method and network device for processing a routing information in a packet data network is proposed, wherein the routing information is extracted from a received message at a border between a first network and a second network, and at least one invalid entry is added to first-network entries of the routing information. The first-network entries relate to a routing path of the message within the first network. The at least one invalid entry and the first-network entries is encrypted by using an own token at least for each of the first-network entries. As an alternative, a tokenized second-network entry extracted from said routing information and relating to the routing path of the message within the second network is decrypted, and its content is reversed. In both cases, the routing information is replaced by the processed routing information and the message is forwarded to the second network. This allows to preserve the order of routing entries and to hide the amount of switches that have been traversed in the home network.

It is noted that the present invention is not restricted to the preferred embodiments described above. The present invention may be implemented in any network node having a routing information encryption and/or decryption functionality in any network. In particular, any header or payload fields of any packet data message or datagram may be used for transferring the routing information. The embodiments may thus vary within the scope of the attached claims.

We claim:

1. A method, comprising:
   extracting, at a network element, routing information from a received message at a border between a first network and a second network;
   generating a decrypted and reversed routing information by decrypting a tokenized second-network routing entry relating to a routing path of said message within said second network and by reversing the content of the decrypted second-network routing entry;
   replacing said routing information of said received message by said decrypted and reversed routing information;
   forwarding said received message with said decrypted and reversed routing information to said second network;
   marking a tokenized network routing entry of at least one of an incoming and outgoing tokenized network node; and
   performing at least one of suppressing said reversing at outgoing tokenizing network nodes and reversing network routing entries at incoming tokenizing network nodes before encryption.

2. The method according to claim 1, further comprising:
   conveying said routing information in a routing header of said message.

3. The method according to claim 2, wherein said routing header comprises at least one of a route header and a via header of a session initiation protocol message.

4. The method according to claim 1, further comprising:
   using a topology hiding method.

5. The method according to claim 4, further comprising applying said topology hiding method in response to a user identity marked with a predetermined information.

6. The method according to claim 4, further comprising applying said topology hiding method in response to a network identity.

7. The method according to claim 1, wherein said tokenized second-network routing entry comprises at least one of an encrypted name and encrypted address information of a sequence of network nodes through which said received message has been routed.

8. The method according to claim 1, wherein said border between said first and second networks is defined at a gateway device which said message traverses on a connection between said first and second networks.

9. An apparatus, comprising:
   extracting means for extracting routing information from a received message at a border between a first network and a second network;
   decrypting and reversing means for generating a decrypted and reversed routing information by decrypting a tokenized second-network routing entry relating to a routing path of said message within said second network and by reversing the content of the decrypted second-network routing entry;
   replacing means for replacing said routing information of said received message by said decrypted and reversed routing information;
   forwarding means for forwarding said received message with said decrypted and reversed routing information to said second network;
   marking means for marking a tokenized network routing entry of at least one of an incoming and an outgoing tokenizing network node; and at least one of suppressing means for suppressing said reversing at outgoing tokenizing network nodes and reversing means for reversing network routing entries at incoming tokenizing network nodes before encryption.

10. The apparatus according to claim 9, further comprising one of an interrogating call session control function and a topology hiding gateway function.

11. The apparatus according to claim 9, wherein said apparatus operates in a packet data network which comprises an Internet protocol multimedia subsystem.

12. The apparatus according to claim 9, wherein said apparatus is configured to suppress reversing of said decryptor and reverser when said routing information indicates that said apparatus is an outgoing tokenizing network node.

13. The apparatus according to claim 9, wherein said apparatus is configured to reverse network routing entries before encryption when said routing information indicates that said apparatus is an incoming tokenizing apparatus.

14. The apparatus according to claim 9, wherein said border between said first and second networks is defined at said apparatus.

15. An apparatus, comprising:
an extractor configured to extract a routing information from a received message at a border between a first network and a second network;
a decryptor, operably connected to said extractor, and configured to generate a decrypted and reversed routing information by decrypting a tokenized second-network routing entry relating to a routing path of said message within said second network and further configured to reverse the content of the decrypted second-network routing entry;
a replacer, operably connected to said extractor, and configured to replace said routing information of said received message with said decrypted and reversed routing information;
a transmitter, operably connected to said extractor, and configured to forward said received message with said decrypted and reversed routing information to said second network;
a marker configured to mark a tokenized network entry of at least one of an incoming and an outgoing tokenizing network node; and
a processor configured to perform at least one of suppressing said reversing at outgoing tokenizing network nodes and reversing network entries at incoming tokenizing network nodes before encryption.

16. The apparatus according to claim 15, further comprising:
one of an interrogating call session control function and a topology hiding gateway function.

17. The apparatus according to claim 15, wherein said apparatus operates in a packet data network which comprises an Internet protocol (IP) multimedia subsystem.

18. The apparatus according to claim 15, wherein said apparatus is configured to suppress reversing of said decrypter when said routing information indicates that said apparatus is an outgoing tokenizing apparatus.

19. The apparatus according to claim 15, wherein said apparatus is configured to reverse network routing entries before encryption when said routing information indicates that said apparatus is an incoming tokenizing apparatus.

20. The apparatus according to claim 15, wherein said border between said first and second networks is defined at said apparatus.

* * * * *